(12) United States Patent  (10) Patent No.: US 7,813,891 B2
Bonino et al.  (45) Date of Patent: Oct. 12, 2010

(54) METHODS AND SYSTEMS FOR DETECTING SPECTROPHOTOMETER MISALIGNMENT

(75) Inventors: Paul S. Bonino, Ontario, NY (US); Timothy J. Sulenski, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 46 days.

(21) Appl. No.: 12/242,117

(22) Filed: Sep. 30, 2008

(65) Prior Publication Data

US 2010/0082287 A1    Apr. 1, 2010

(51) Int. Cl.
*G01B 11/27* (2006.01)

(52) U.S. Cl. ............... 702/150; 702/104; 702/105; 702/127; 702/151; 702/152; 702/153; 702/155; 702/158; 250/208.1; 250/239; 250/566; 356/305; 356/326; 356/328

(58) Field of Classification Search .......... 702/104, 702/105, 127, 150–153, 155, 158; 250/208.1, 250/239, 566; 356/305, 328

See application file for complete search history.

(56) References Cited

U.S. PATENT DOCUMENTS 6,647,148 B2 * 11/2003 Ozawa et al. ............... 382/199

OTHER PUBLICATIONS

None, "Diffuse Reflectance Targets," from Internet, www.labsphere.com/data/userFiles/Targets%20product%20sheet_8.pdf, Apr. 2008, 2 pp.

None, "Least Squares Fit of Straight Line to Data," 1.105 Solid Mechanics Laboratory, from Internet, ocw.mit.edu/NR/rdonlyres/Civil-and-Environmental-Engineering/1-105Solid-Mechanics-LaboratoryFall2003/...FFDF.../leastsqrs.pdf, Sep. 24, 2003, 3 pp.

None, "Correlation Coefficient," from Internet, http://mathbits.com/Mathits/TISection/Statistics2, correlation.htm, accessed Aug. 1, 2008, 3 pp.

None, "Linear Regression," from Wikipedia, Internet, http://en.wikipedia.org/wiki/Linear_regression, accessed Aug. 1, 2008, pp. 1-13.

None, "Coefficient of determination," from Wikipedia, Internet, http://en.wikipedia.org/wiki/Coefficient_of_determination, accessed Aug. 1, 2008, pp. 1-6.

* cited by examiner

*Primary Examiner*—Sujoy K Kundu
(74) *Attorney, Agent, or Firm*—Pillsbury Winthrop Shaw Pittman LLP (57) ABSTRACT

This application generally relates to methods and systems for detecting spectrophotometer misalignment. In particular, the application may characterize the noise of a spectral measurement relative to a reference substrate known to exhibit a generally linear (flat) spectral output over a known spectrum. From the spectral measurement, a linear regression may be performed on a portion of the spectral output to determine a best fit line and a correlation of determination ("R-squared value") may be determined correlated the measured data to the best fit line. Finally, the R squared value may be compared to a predetermined threshold R squared value to determine if the sensor is misaligned beyond an acceptable amount. If so, an alert may be generated.

20 Claims, 7 Drawing Sheets

METHODS AND SYSTEMS FOR DETECTING SPECTROPHOTOMETER MISALIGNMENT

FIELD

This application relates to methods and systems for detecting spectrophotometer misalignment relative to a substrate.

BACKGROUND

Figure 1:
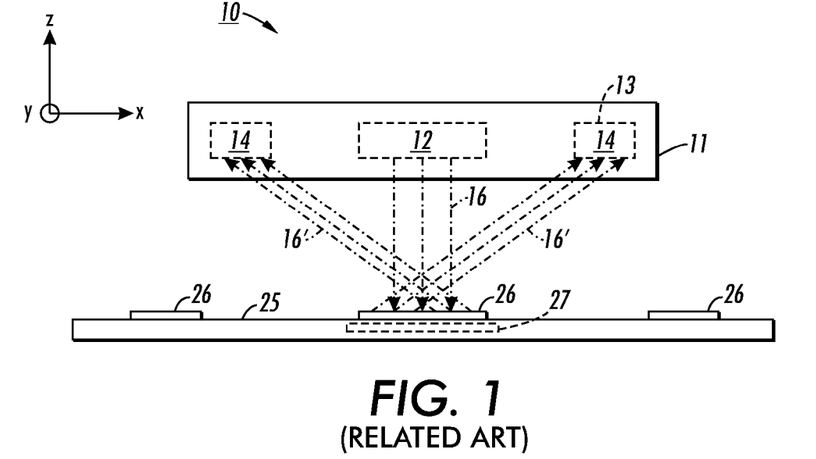
FIG. 1 shows a front perspective view of an inline spectrophotometer (ILS) for making color measurements of printed media.

FIG. 1 shows a front perspective view of an inline spectrophotometer (ILS) 10 for making color measurements of substrates 25. For example, the ILS 10 may be an X-Rite® ILS15 spectrophotometer available from X-rite Inc. (Grand Rapids, Mich.).

The ILS 10 generally includes a housing 11 enclosing a illuminator 12 and a ring 13 of photosensors 14. The ILS 10 may be used to take color measurements, for example, of inks 26 and the substrate 25. A processor (not shown), such as an integrated circuit and/or software, may be provided for analyzing measured color data.

The substrate 25 may be one or more of: 8½×11 inch letter paper, A4 letter paper, or 8½×14 inch legal paper. However, it will be appreciated that other sizes and substrate media types may similarly be used, such as, bond paper, parchment, cloth, cardboard, plastic, transparencies, film, foil, or other print media substrates. The substrate 25 may also be a reference calibration tile.

The substrate 25 is generally located in an XY plane spaced below the ILS 10. An area 27 of the substrate 25 may be illuminated by light 16 produced by the illuminator 12. In one implementation, the illuminator 12 may be a fluorescent lamp, producing broad spectrum of "white" light across the visible spectrum (i.e., from about 400 to 750 nm (in wavelength)). Other illuminators may similarly be used, such as light emitting diodes (LEDs).

Light reflected 16' from the inks 26 or the substrate 25 may be generally directed in various directions, with a portion 16' thereof (shown) directed toward the ring 13 of photosensors 14 for measurements.

Figure 2:
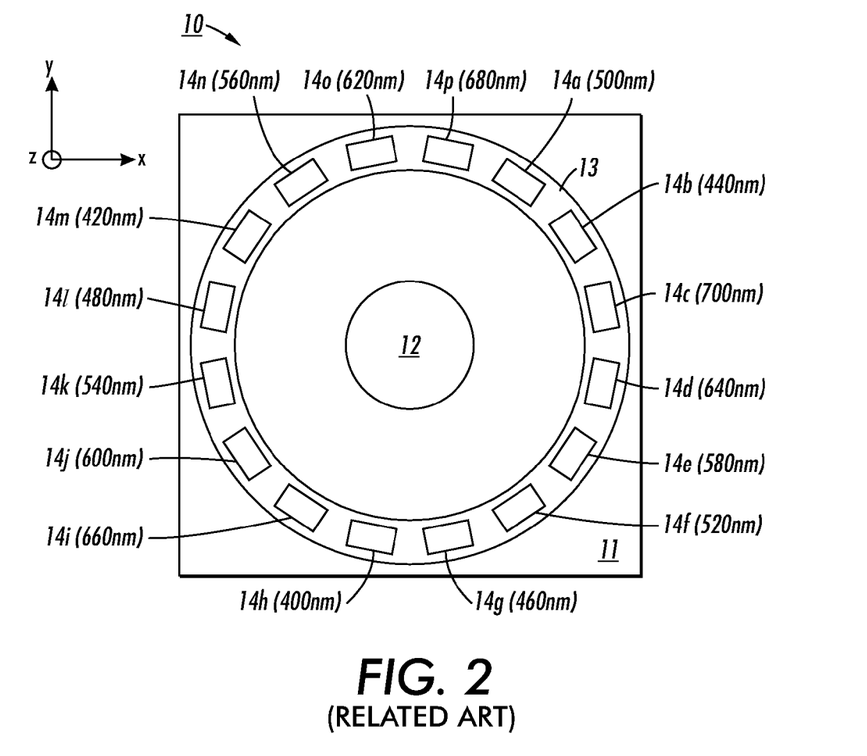
FIG. 2 shows a bottom plan view of the ILS shown in FIG. 1.

FIG. 2 shows a bottom plan view of the ILS 10 shown in FIG. 1. In the implementation shown, the ring 13 includes sixteen (16) photosensors 14a-14p, such as photodiodes, spaced equally about in a circular manner. In one implementation, the ring 13 many have an inner nominal radius of approximately 1 cm, although it will appreciated that other configurations and/or sizes are possible. The photosensors 14a-14p, may be selectively filtered or otherwise configured to detect light of specific wavelength. The specific wavelength that a particular photosensor 14 is configured to detect is shown in parentheses below the reference numeral. For example, photosensor 14a is configured to detect light having a wavelength of approximately 500 nm.

The output of the ILS 10 may be normalized (i.e., calibrated) as is generally known in the art when making color measurements. These measurements are typically feed back to the printer for controlling various aspects of color output.

The ILS 10 may have strict mechanical positioning relative to paper requirements (e.g., ±0.25 mm and ±1 degree). If these requirements are not met, an inaccurate color measurement of printed paper which the print system perceives as a slight color shift and may erroneously mis-calibrate color profiles.

SUMMARY

According to one aspect of the application, a method for detecting misalignment of a photosensor in a printing system, is provided comprising: measuring with a sensor a reflectance spectra of a substrate over a spectrum known to produce a generally linear response; determining with a controller a best fit line for the spectral measurement data; determining with the controller a correlation of determination of the spectral measurement, R squared value, correlating the spectral measurement data with the best fit line; and generating an alert, if the R squared value does not exceed a predetermined threshold.

According to another aspect of the application, a system for detecting misalignment of a photosensor in a printing system, is provided comprising: a photosensor configured to measure a reflectance spectra of a substrate over a spectrum known to produce a generally linear response; a controller configured to determine a best fit line for the spectral measurement data and a correlation of determination of the spectral measurement, R squared value, correlating the spectral measurement data with the best fit line; and a device configured to generate an alert, if the R squared values does not exceed a predetermined threshold.

Other objects, features, and advantages of one or more embodiments of the present application will seem apparent from the following detailed description, and accompanying drawings, and the appended claims.

BRIEF DESCRIPTION OF THE DRAWINGS

Embodiments of the present application will now be disclosed, by way of example only, with reference to the accompanying schematic drawings in which corresponding reference symbols indicate corresponding parts, in which.

DETAILED DESCRIPTION

The inventors performed testing to determine the impact of mechanical misalignment of the ILS on spectral measurements.

Figure 3:
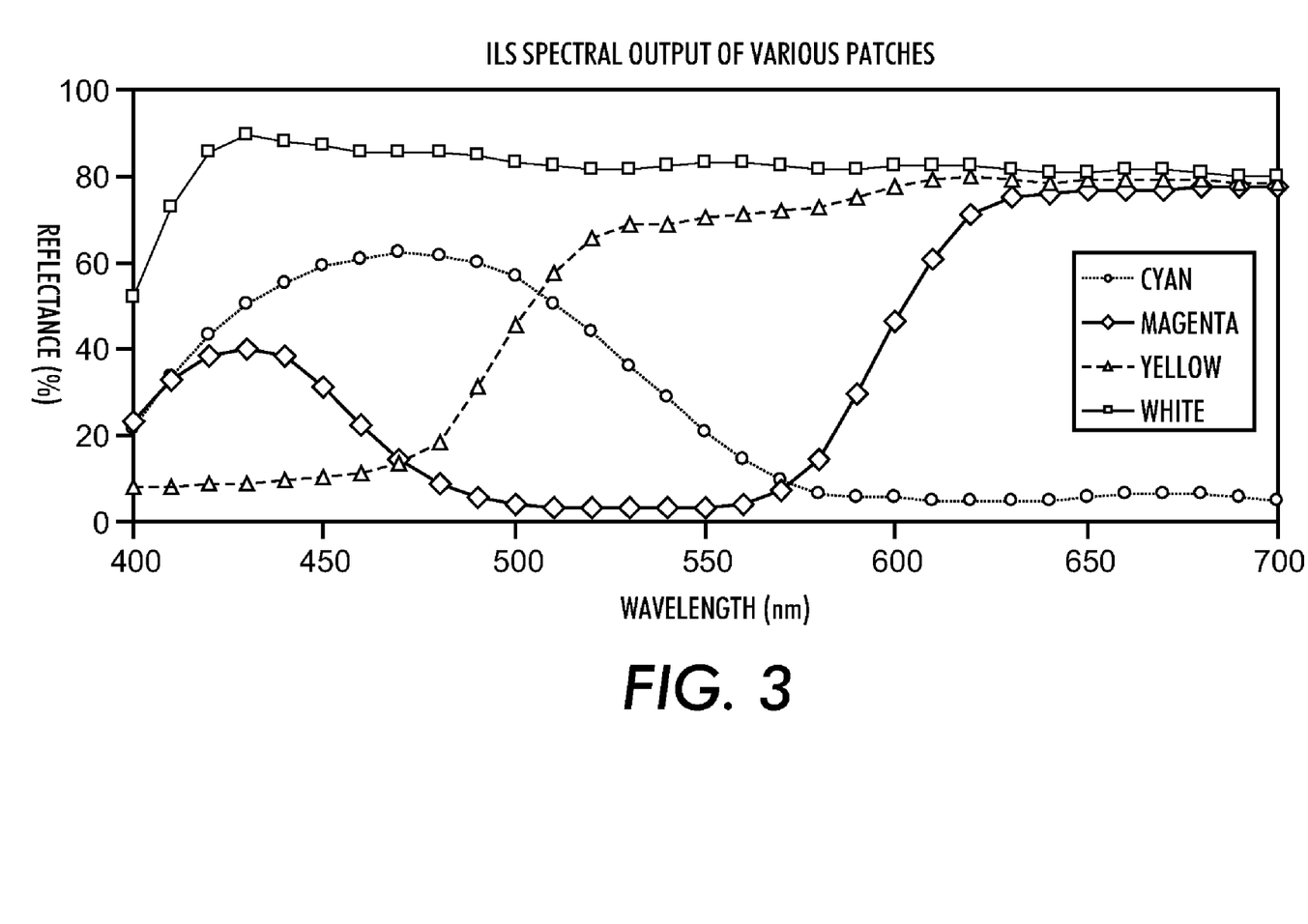
FIG. 3 shows the spectral response of the ILS for various color patches printed by a Xerox iGen3® digital printing press, and white paper.

FIG. 3 shows the spectral response of the ILS for various color patches printed by a Xerox iGen3® digital printing press, and white paper. The color test patches included cyan, magenta, and yellow inks on a ordinary white piece of paper at normal mounting. The paper type that was used was Xerox DC Elite Gloss (white).

As is readily apparent from the plot, these colors have significantly different reflectance spectra over the visible spectrum, from about 400 to 700 nm (wavelength). In particular, various portions of the spectral data may have relatively high and linear (flat) reflectance responses. For example, white paper demonstrates a relatively high and linear (flat) response from approximately 500 nm to 700 nm.

Similarly, the colors patch also show a linear (flat) response, as follows: cyan (approximately 460 to 480 nm), magenta (approximately 650 to 700 nm), and yellow (approximately 620 to 700 nm).

As such, the output of a properly aligned ILS should detect a relatively linear (flat) response, for example, over these spectra.

Figure 4:
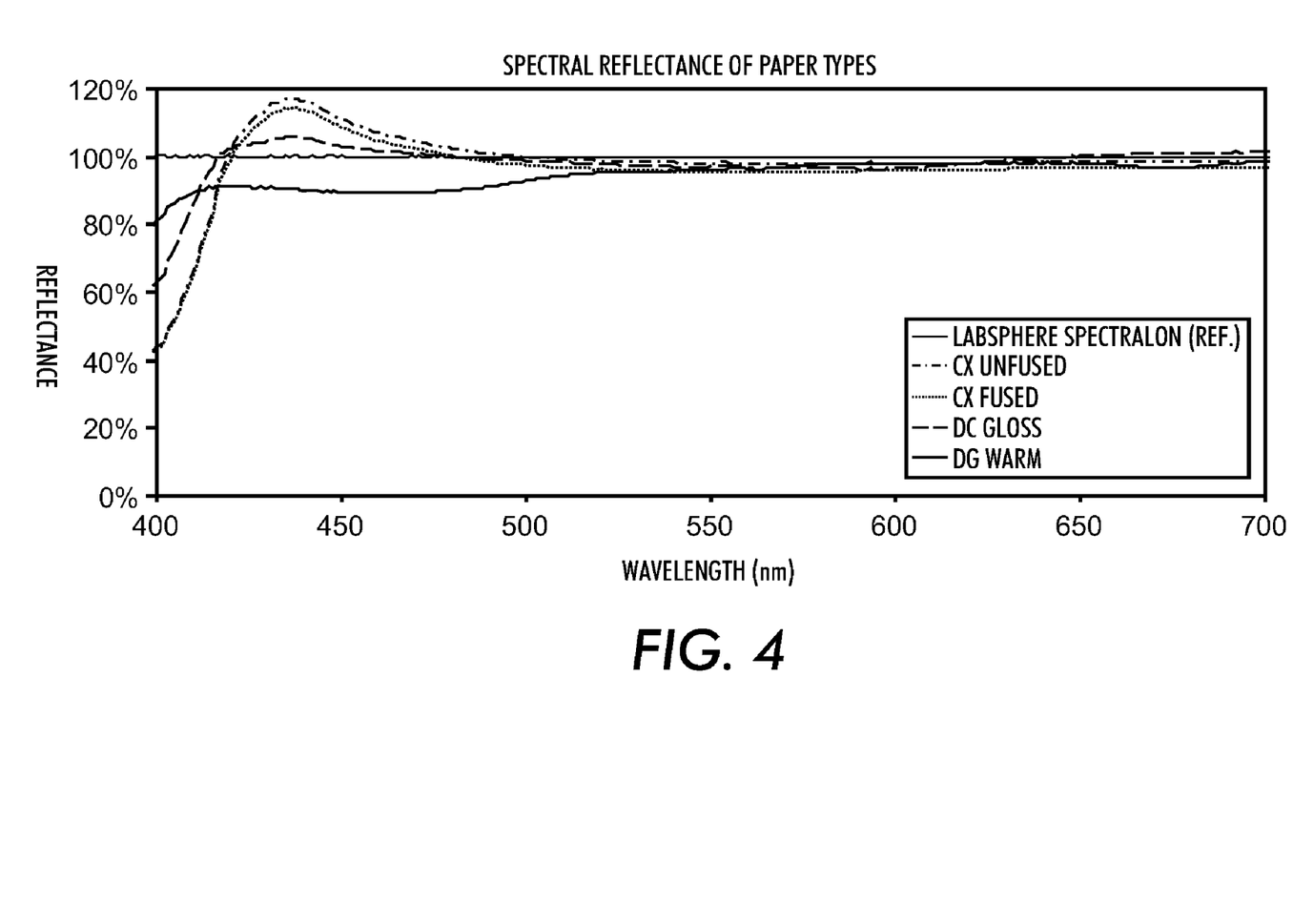
FIG. 4 shows the measurement output for ILS of various white paper types.

FIG. 4 shows the spectral reflectance of various paper types from approximately 400 nm to 700 nm. These paper types included four ordinary white sheets of paper, one of: Xerox Color Xpressions Text ("CX unfused"); Xerox Color Xpressions Text run through a Xerox iGen3® digital printing press to fuse the gloss ("CX fused"); Xerox DC Elite Gloss Test ("DC Gloss") and Xerox Digital Gloss Warm ("DG Warm"). All spectral outputs are plotted relative to a Labspace Spectrolan 99% diffuse non-fluorescing white calibration tile.

The plot shows that a spectral output for the various sheet of white paper. As can be seen, the reflectance profile is linear generally in the 525 to 700 nm spectrum, regardless of the type of paper (substrate) used.

By contrast, for white paper wavelengths between about 400 to 440 are considerably "noisy," because the illuminator typically has a low output at those wavelengths and a large gain is provided by the processor (whether by hardware or firmware). This large noise may further be combined with noise due to misalignment of the ILS may result in signals that deviate far from nominal.

Moreover, for paper (or other media) which may contain fluorescence agents, like whiteners and brighteners, ultraviolet radiation (UV) emitted from the illuminator may excite the whiteners and brighteners which typically illuminate in 425-475 nm range. As such, they may emit their own light and the ILS may receive excessive light than is actually reflecting off of the paper, resulting in some reflectance values being greater than 100%.

Figure 5:
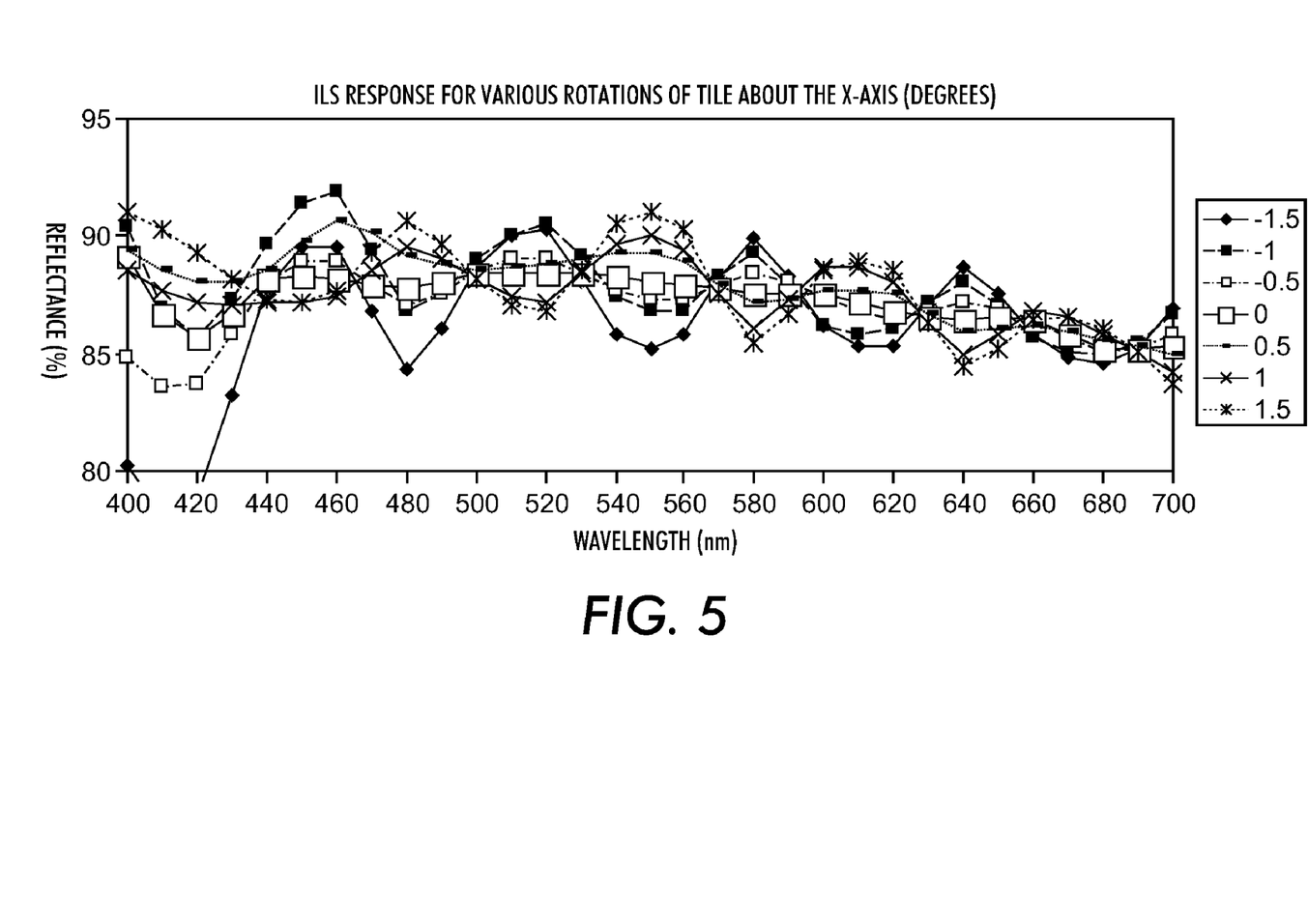
FIG. 5 shows the ILS measurement output for a white, non-fluorescing calibration tile measured when its surface is perpendicular to the ILS sensor as well as various angles from the normal line, when rotated (tilted) about the X axis.
Figure 6:
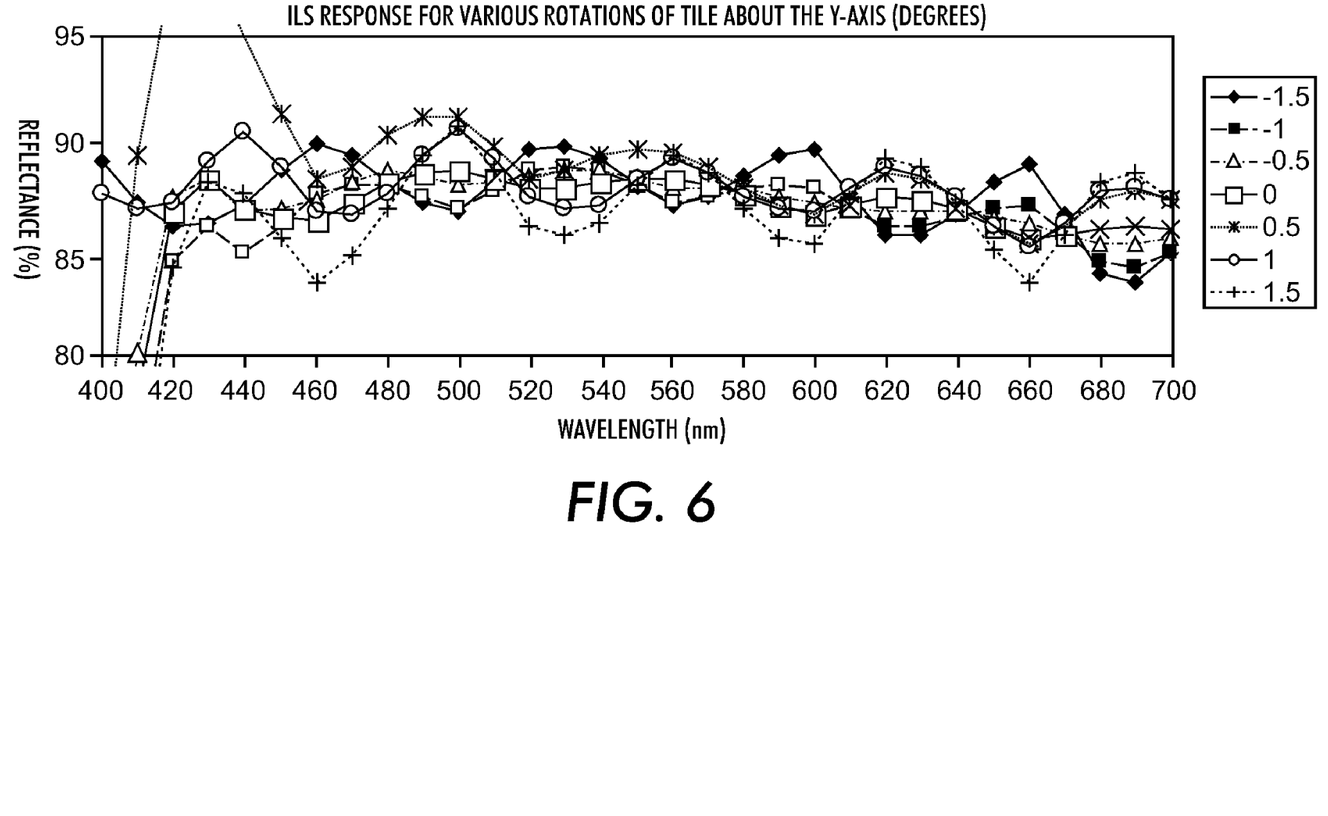
FIG. 6 shows the measurement output for the same white, non-fluorescing calibration tile measured when its surface is perpendicular to the ILS as well as various angles away from the normal line, which rotated (tilted) about the Y axis.

FIGS. 5 and 6 show ILS spectral measurements for a white, non-fluorescing calibration tile measured as well as various angles from the normal line, when rotated (tilted) about the X and Y axes, from about 530 to 700 nm.

The measurements were made using a diffuse non-fluorescing white calibration (reference) tile provided along with an X-Rite® ILS15, using an X-Rite® ILS15 tungsten halogen white light source, both of which are available from X-Rite, Inc. For these spectral measurements, the calibration tile was generally located in and centered about an XY plane spaced below the ILS (similar to arrangement shown in FIG. 1).

FIG. 5 shows ILS spectral measurements for the tile when its surface is perpendicular to the ILS sensor as well as various angles (about ±1.5 degrees) from the normal line, when rotated (tilted) about the X axis As can be seen from FIG. 5, some wavelengths have a higher signal values and some have a lower signal values than the measurement when the tile is in normal alignment. This misalignment induces an apparent sinusoidal wave noise that is added to the spectral data.

FIG. 6 shows spectral measurements for the same tile measured when its surface is perpendicular to the ILS as well as same angles away from the normal line, which rotated (tilted) about the Y axis. A similar trend of induced sinusoidal wave noise is added to the spectral data as is shown FIG. 5.

It is apparent from FIGS. 5 and 6 that for different wavelengths there may be higher and lower reflectance values depending on the direction of the tilt. This is the typical response of the X-Rite® ILS15 to angular misalignment.

For example, as shown in FIG. 2, the photosensors 14a-14p are positioned about the ring 13, such that consecutive wavelength detecting photosensors 14 are located in different quadrants on the ring 13. Thus, when the ILS 10 is rotated or tilted (e.g., about the X or Y axes), the ring 13 of photosensors may have a portion closer to the media 25 and a portion further away the media. Those photosensors 14 having a specific wavelength that are tilted away from the media 225 will generate a weaker signal and those tilted closer will generate a stronger signal than if the ILS was positioned parallel to media.

Accordingly, a rotation or tilt of the tile (or other surface) may result in a reflectance spectra that has a distinct pattern generally of a 'sine' wave. As can be seen, when the angle of misalignment increases, to about ±1.5 degrees, the magnitude of the noise increases also.

It will appreciated that other spectrophotometers and color measurements device may have different photosensor configurations and thus, may exhibit other characteristic noise patterns affected by misalignment.

Figure 7:
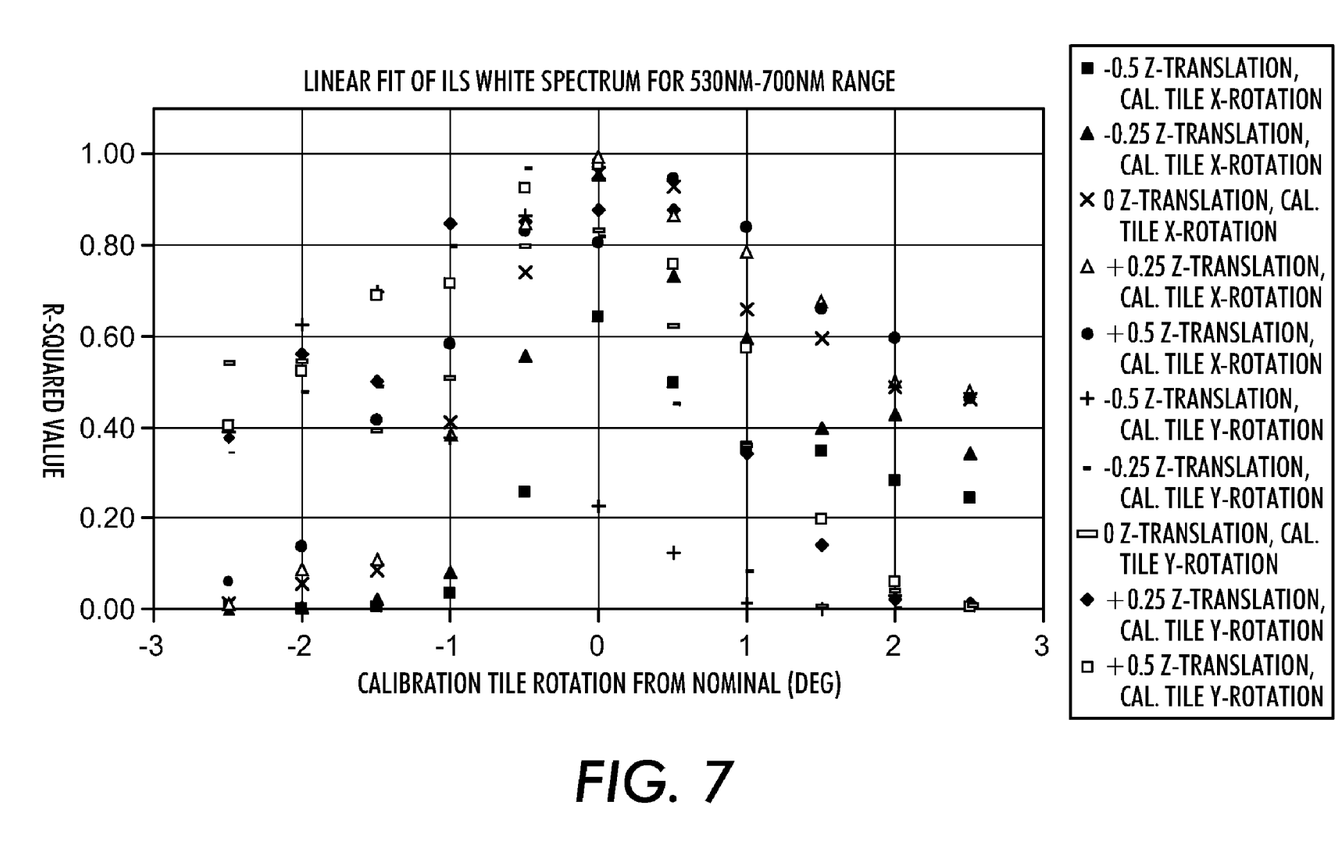
FIG. 7 shows results of calculating the coefficient of determination (R squared) for the linear regression for the spectral region from about 530 to 700 nm for a white, non-fluorescing tile measured at various linear and angular misalignments.

The inventors next characterized the linearity of spectral measurements, from about 530 to 700 nm, for various linear and angular misalignments of the ILS 10 spectrophotometer relative to the tile.

The calibration tile was rotated (tilted) about the X and Y axes to simulate various angular misalignments, of about ±2.5 degrees. In addition, the ILS was translated ±0.5 mm along the Z axis from its nominal position relative to the tile to simulate linear misalignments, as noted in the legend.

For each of the spectral measurements taken, a best-fit line was determined using a linear regression algorithm. In addition, the coefficient of determination, $R^2$ ("R-squared") was determined correlating the spectral data to the best fit line for each spectral measurements.

FIG. 7 shows results of plotting the coefficients of determination, $R^2$ ("R-squared values") for the various spectral measurements. The R squared values are plotted for data points corresponding to the particular linear and/or angular misalignments. The horizontal axis indicates the angular misalignment (e.g., rotation about either the X or Y axes) and the legend indicates the linear misalignment (e.g., translation along the Z axis).

As can be seen, with substantially no relative linear or angular misalignment of the ILS and the tile having been introduced, the R squared values were close to 1.0.

However, as linear and/or angular misalignments are introduced the R squared values decrease, getting periodically worse as the misalignments increase. This is further compounded when both linear and angular misalignments occur together.

According to an further aspect, a methodology is provided for detecting the noise signature that appears on an ILS measurement when the ILS is angularly misaligned.

In particular, a controller logic may be provided that characterizes the noise of a spectral measurement relative to a reference substrate known to exhibit a generally linear (flat) spectral output over a known spectrum. From the spectral measurement, a linear regression may be performed on a portion of the spectral output to determine a best fit line and a correlation of determination ("R-squared value") may be determined correlated the measured data to the best fit line. The R squared value may be compared to a predetermined threshold R squared value to determine if the sensor is misaligned beyond an acceptable amount. If so, an alert may be generated.

Figure 8:
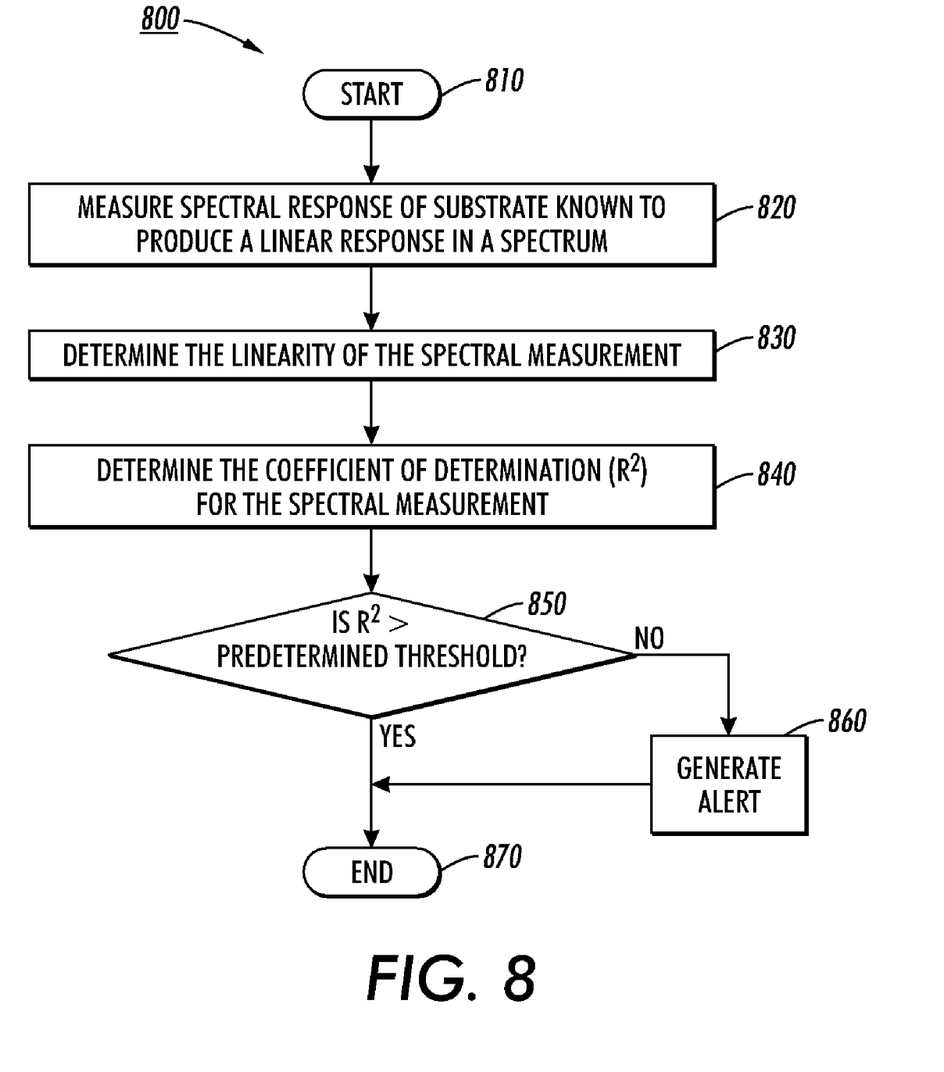
FIG. 8 shows a controller logic process for detecting spectrophotometer misalignment, in accordance with an embodiment.

FIG. 8 shows a controller logic process 800 for detecting the determining misalignment of a spectrophotometer or other photosensor, according to one embodiment. While reference is made to a ILS, it will be appreciated that the application may be similarly used for other color sensing devices.

The process begin in step 810. The controller may be used in conjunction with a calibration routine in a printing system. In other implementations, the controller may a part of the ILS. It will be further appreciated that, the calibration may be performed automatically without user action, such as during a automated calibration process.

Next, in step 820, the ILS measures a reflectance spectra of a white or other colored substrate over a spectra having a predicted or known generally linear (flat) response.

For example, referring to FIG. 3, the portions of the spectral data that have relatively high and relatively linear (flat) responses are as follows: cyan (approximately 460 to 480 nm), magenta (approximately 650 to 700 nm), yellow (approximately 620 to 700 nm) and white (approximately 500 to 700 nm).

Other colors (not shown) will demonstrate their own unique spectral responses as well, which may exhibit linear (flat) reflectance profiles.

The output of the ILS may be normalized (i.e., calibrated) as is generally known in the art when making color measurements.

In step 830, the controller determines the linearity of the spectral measurement. In one implementation, a least squares fit algorithm may be used, although it will be appreciated other models may also be used.

For example, a linear regression algorithm may be used to model a best fit line correlating the measured spectral data including n points $(x_1, y_1), (x_2, y_2), \ldots, (x_n, y_n)$. Generally, x values correspond to wavelengths and y values correspond to reflectance values, although it will be appreciated that other data could also be used.

The best fit line may then be determined, according to equation (1), as follows:

$$f(x) = mx + b \quad (1)$$

where, m is the slope of the best fit line in equation (2) and may determined according to equation (2), as follows:

$$m = \frac{n \sum_i x_i \cdot y_i - \sum_i x_i \sum_i y_i}{n \left(\sum_i x_i\right)^2 - \left(\sum_i x_i\right)^2} \quad (2)$$

b is the y-intercept of the best fit line in equation (3) and may determined according to equation (3), as follows:

$$b = \frac{\sum_i y_i - m \sum_i x_i}{n} \quad (3)$$

Next, in step 840, the controller may determine the variability of the data corresponding to the spectral measurement and the best fit line.

The coefficient of determination, $R^2$ (or R squared) is a measure of the variability of the data set accounted for by the linear regression. The "variability" of the data set may be measured through different sums of squares. R-squared values may be determined according to the equation (4), as follows:

$$R^2 = 1 - \frac{SSE}{SST} \quad (4)$$

where,

SSE is the sum of the squared errors (also called the residual sum of squares) and may be determined according to equation (5), as follows:

$$SSE = \sum_i (y_i - f(x_i))^2 \quad (5)$$

SST is the total sum of the squares (proportion to the variance) and may be determined according to equation (6), as follows:

$$SST = \sum_i (y_i - \bar{y})^2 \quad (6)$$

where, $\bar{y}$ is the mean of the reflectance values, y, and may be determined according to equation (7), as follows:

$$\bar{y} = \frac{1}{n} \sum_i y_i \quad (7)$$

The resultant R squared value will be between 0.0 and 1.0 (0% to 100%). In particular, if there is a strong positive linear correlation of the data, the R squared value will be close to 1.0 (indicating a perfect fit condition, if which all data points all lie exactly on the best fit line). On the other hand, if there is a weak linear correction, the R squared value will be close to 0.0.

In step 850, the R squared value for the reflectance measurement may be compared with a predetermined threshold. This may be a Boolean operation.

In one implementation, an R squared value acceptance criteria may be set to a minimum of 0.8. The inventors have determined that for the test configuration disclosed herein, this generally permits only a misalignment of ±1 degree (angular) for ±0.25 mm (linear) and ±0.5 degree (angular) for ±0.5 mm (linear). If the R squared value is below about 0.8, for example, this may indicate a weak correlation between the data across the spectrum.

The threshold may also be variable. For example, it may be set higher for customers who demand a higher level of color accuracy, or decreased for customers who may not require color accuracy less critical.

Next, in the step 860, the controller may generate an alert to notify a user that the spectrophotometer may be misaligned based on the comparison performed in step 850. In some implementations, this may be an error message that is displayed in graphical user interface (GUI) of the printing system, and/or other display devices. For example, a fault can be raised stating the ILS data is possibly misaligned.

Optionally, the ILS and/or printing system may have a blinking light (such as an LED, lamp, etc.) or other means designated for this purpose. Additionally, or alternatively, the alert may be audible (for example, though a speaker or siren).

Based on the alert, a user may take correction action, or call customer service. This may result in replacement of the ILS or remounting processes.

The controller may be used to determine not just a certain problem (i.e. a certain parameter exceeds a certain threshold), but that a problem is consistently getting worse. For example, a misalignment may not be currently be at the level to require action, but over time may be increasing.

According to one embodiment, the history of spectral measurements and R squared values may be maintained in a log on the machine (such as a memory), and/or transferred remotely so they are made available to a Customer Service Engineer (CSE) for service.

The process ends in step 870.

The controller may be dedicated hardware like ASICs or FPGAs, software (firmware), or a combination of dedicated hardware and software. For the different applications of the embodiments disclosed herein, the programming and/or configuration may vary.

While the above examples and embodiments are directed to substrates or inks with reflectivity in the visible spectrum, it will be appreciated the embodiments disclosed herein, may be used with other spectrums, such as infrared (IR) or ultraviolet (UV).

The ILS 10 may be incorporated into an ink printer. Although, it will be readily appreciated that the system may be used with other printing technologies, such as ink jet (bubble jet), laser, dot-matrix, solid-ink, dye sublimation, plotters, lithographic, xerographic, and electrostatic.

While this invention has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the invention following, in general, the principles of the invention and including such departures from the present disclosure as come within known or customary practice in the art to which the invention pertains, and as may be applied to the essential features hereinbefore set forth and followed in the spirit and scope of the appended claims.

What is claimed is:

1. A method for detecting misalignment of a photosensor in a printing system, comprising:
    measuring with a sensor a reflectance spectra of a substrate over a spectrum known to produce a substantially linear response, the spectral measurement data including measured reflectance values at a plurality of different wavelengths over the spectrum;
    determining with a controller a best fit line for the spectral measurement data;
    determining with the controller a correlation of determination of the spectral measurement, R squared value, correlating the spectral measurement data with the best fit line; and
    generating an alert, if the R squared value does not exceed a predetermined threshold.

2. The method according to claim 1, wherein the reference substrate is white and the spectrum is about 500 to 700 nm.

3. The method according to claim 1, wherein the reference substrate is cyan and the spectrum is about 460 to 480 nm.

4. The method according to claim 1, wherein the reference substrate is magenta and the spectrum is about 650 to 700 nm.

5. The method according to claim 1, wherein the reference substrate is yellow and the spectrum is about 620 to 700 nm.

6. The method according to claim 1, further comprising:
    using a least fit squares fit algorithm to determine the best fit line.

7. The method according to claim 1, wherein the predetermined threshold is an R squared value of about 0.8.

8. The method according to claim 1, wherein the photosensor comprises:
    a plurality of photosensors spaced equally in a circular manner, each photosensor configured to detect light of a different wavelength.

9. The method according to claim 1, wherein the alert is one or more of: a visible alert or an audible alert.

10. The method according to claim 1, further comprising:
    maintaining a log of spectral measurements and/or R squared values.

11. A system for detecting misalignment of a photosensor in a printing system, comprising:
    a photosensor configured to measure a reflectance spectra of a substrate over a spectrum known to produce a substantially linear response, the spectral measurement data including measured reflectance values at a plurality of different wavelengths over the spectrum;
    a controller configured to determine a best fit line for the spectral measurement data and a correlation of determination of the spectral measurement, R squared value, correlating the spectral measurement data with the best fit line; and
    a device configured to generate an alert, if the R squared values does not exceed a predetermined threshold.

12. The system according to claim 11, wherein the reference substrate is white and the spectrum is about 500 to 700 nm.

13. The system according to claim 11, wherein the reference substrate is cyan and the spectrum is about 460 to 480 nm.

14. The system according to claim 11, wherein the reference substrate is magenta and the spectrum is about 650 to 700 nm.

15. The system according to claim 11, wherein the reference substrate is yellow and the spectrum is about 620 to 700 nm.

16. The system according to claim 11, further comprising:
    using a least fit squares fit algorithm to determine the best fit line.

17. The system according to claim 11, wherein the predetermined threshold is an R squared value of about 0.8.

18. The system according to claim 11, wherein the photosensor comprises:
    a plurality of photosensors spaced equally in a circular manner, each photosensor configured to detect light of a different wavelength.

19. The system according to claim 11, wherein the device configured to generate an alert is one or more of: a visible alerting device or an audible alert device.

20. The system according to claim 11, wherein the system is configured to maintain a log of spectral measurements and/or R squared values.

* * * * *